Figure 1:
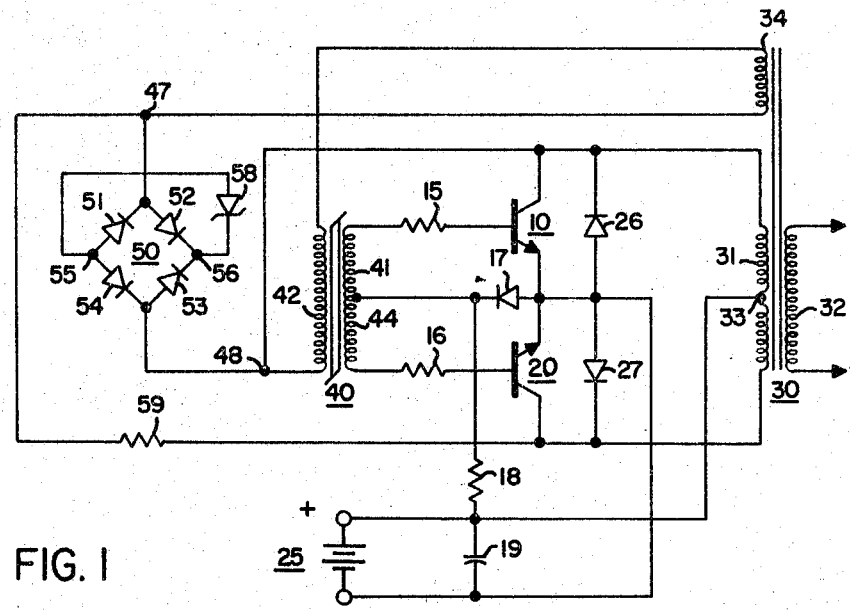

June 6, 1967 G. MEHWALD 3,324,411
TRANSISTOR INVERTER WITH INVERSE FEEDBACK
FREQUENCY STABILIZATION CONTROL
Filed Aug. 12, 1965

*INVENTOR.*
GÜNTHER MEHWALD
BY
Roger W. Jensen
ATTORNEY

United States Patent Office 3,324,411
Patented June 6, 1967

3,324,411
TRANSISTOR INVERTER WITH INVERSE FEEDBACK FREQUENCY STABILIZATION CONTROL
Günther Mehwald, Alzenau, Germany, assignor to Honeywell G.m.b.H., Frankfurt am Main, Germany, a corporation of Germany
Filed Aug. 12, 1965, Ser. No. 479,164
Claims priority, application Germany, Sept. 12, 1964, H 53,769
5 Claims. (Cl. 331—113)

The present invention pertains to oscillators. More particularly the invention deals with an improvement in the frequency stability of a transistor inverter of the type described in U.S. Patent 2,997,664. This well-known inverter circuit uses two transistors which are consecutively switched off and on during alternate halves of the inverter cycle. The collector electrodes of these two transistors are connected to the primary winding of an output transformer. The base electrodes are in connection with the end terminals of the secondary winding of a feedback transformer, which operates under saturated conditions. The DC voltage supply is inserted between the center-tap of the output transformer and the emitter electrodes of both transistors, said emitter electrodes being connected to each other. For stabilizing the frequency of the output AC signal, a voltage limiter arrangement is connected parallel to the primary winding of the feedback transformer. The fedback voltage is obtained from a separate feedback winding of the output transformer and is fed into the primary winding of the feedback transformer by means of a current limiting resistor.

Experience has shown that this voltage limiting arrangement sometimes, if the supply voltage is changing, is not able to provide sufficient frequency stability. The reason for this is the internal dynamic resistance of the voltage limiting arrangement which is very small but not zero. If the supply voltage increases, the frequency of the transistor inverter increases also.

In order to avoid any influence of variations of the supply voltage on the frequency of the created AC, in accordance with the present invention an inverse voltage is fed in series with the feedback voltage into the primary circuit of the feedback transformer, said inverse voltage being proportional to the feedback voltage and having such an amplitude that the voltage on the primary winding of the feedback transformer remains constant under all conditions of operation. In order to achieve a correct compensation, the amplitude of the inverse voltage should be adjustable, for instance by means of a potentiometer.

The amplitude requirement of the compensating voltage depends on the relation between the dynamic internal resistance of the limiter arrangement to the sum of the current limiting resistance and the dynamic internal resistance. Therefore, according to further improvement of the invention, instead of altering the inverse voltage, either the aforementioned resistance ratio, or the amplitude of the feedback voltage, or both, may be made adjustable. Adjusting the feedback voltage in most instances is simpler than changing the amplitude of the inverse or compensating voltage because this voltage is obtained from an auxiliary winding of the output transformer, which includes only a few turns. The feedback voltage can be obtained, as illustrated in the inverter of Patent 2,997,664, from a separate feedback winding of the output transformer or, according to an improvement of the present invention can be taken directly from the collector electrodes of the two transistors so that no separate feedback winding is needed.

The voltage limiting arrangement can include, as well-known, two serially connected Zener-diodes which are connected in parallel to the primary winding of the feedback transformer. According to a further improvement of this invention, a rectifier bridge circuit is used having one Zener-diode connected between its diagonal terminals. Such a circuit is of advantage as only one Zener diode is needed and it is assured that the limiting voltage in both directions is of the same amount.

It is, therefore, an object of the present invention to provide an improved oscillator.

Figure 2:
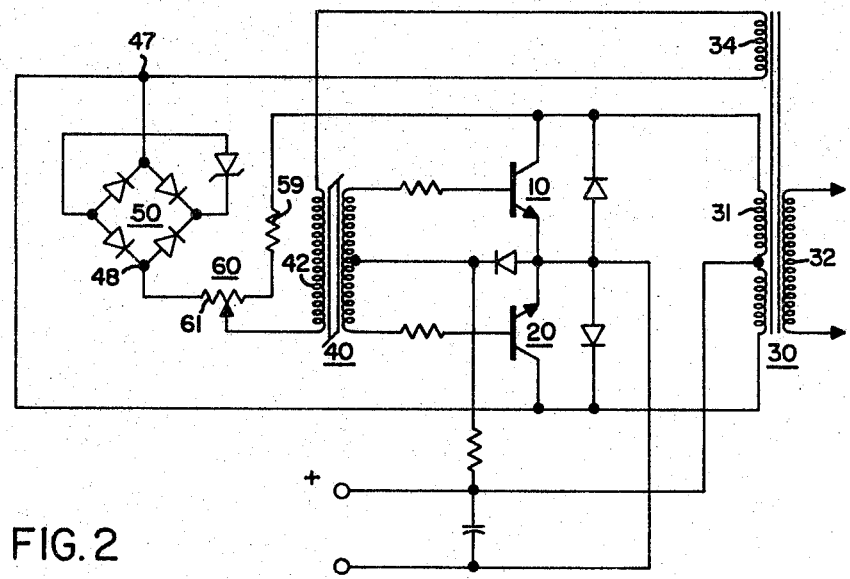

More particularly, it is an object of the present invention to provide an oscillator with improved frequency stability. These and other objects will become apparent to those skilled in the art upon examination of the following specification, claims, and the drawing in which:

FIGURE 1 is one embodiment of the present invention and
FIGURE 2 is a similar embodiment with an additional potentiometer for accurately adjusting the compensation for variations in the DC supply voltage.

In both embodiments of the present invention, the collector electrodes of a pair of transistors 10 and 20 are respectively connected to opposing end terminals of a primary winding 31 of an output transformer 30. Primary winding 31 has an intermediate tap which is connected to the positive terminal of a DC voltage source 25. The negative polarity terminal of voltage source 25 is connected to the emitter electrodes of transistors 10 and 20. The base electrodes of the two transistors are respectively connected through resistors 15 and 16 to opposing end terminals of a winding 41 on a feedback transformer 40. Winding 41 further has an intermediate tap 44. Output transformer 30 has an output winding 32 and a further winding 34, and feedback transformer 40 has an additional winding 42.

A diode 17 is connected between the emitter electrodes of transistors 10 and 20 and intermediate tap 44 on winding 41 of feedback transformer 40. Diode 17 is connected for forward current flow from the emitter electrodes to intermediate tap 44. A resistor 18 is connected between the intermediate tap 44 on winding 41 and the positive polarity terminal of DC voltage source 25, and a capacitor 19 is connected between the positive and the negative polarity terminals of DC source 25. Diode 17, in combination with resistor 18 and capacitor 19, facilitates the starting of oscillations in the inverter. A diode 26 is connected between the emitter and the collector electrodes of transistor 10, and a diode 27 in connected between the emitter and the collector electrodes of transistor 20. Diodes 26 and 27 are orientated for forward current flow from the emitter to the collector electrodes. The function of these two diodes is to shunt inductive inverse currents when the corresponding transistor is switched off. The output AC voltage signal can be obtained from secondary winding 32 of output transformer 30.

Winding 42 on feedback transformer 40 has one of its ends connected directly to the collector electrode of transistor 10 and has its other end connected to the collector electrode of transistor 20 through a series path of winding 34 on transformer 30 and resistor 59. The feedback voltage fed into winding 42 on feedback transformer 40, therefore, is obtained directly from the collector electrodes of the two transistors. By means of winding 34 on output transformer 30, a compensating or inverse voltage $KV_o$ is fed into the primary circuit of feedback transformer 40. This inverse voltage is proportional but in opposite phase relation to the feedback voltage which is obtained from the two collector electrodes of the transistors. The result of this series connection is that a voltage $V_t$ is present at primary winding 42 of feedback transformer 40 which is equal to the feedback voltage reduced by $KV_o$ and the potential drop across resistor 59. Connected in parallel to the series connection of windings 34 and 42 is a voltage limiting arrangement including a bridge circuit comprised of diodes 51, 52, 53, and 54 and a Zener diode 58 connected in the diagonal branch of the bridge. While in the arrangement in Patent 2,997,664, the voltage on the primary winding of the feedback transformer is limited to a constant value, according to the present invention, the voltage $(V_t-KV_o)$ is limited to a constant value. By means of this, the desired frequency stability is achieved. Factor K of proportionality can be derived from limiting resistor 59 and the dynamic internal resistance $r$ of the voltage limiting arrangement by the formula $$K=\frac{r}{R+r}$$

It can be seen from this formula that the conditions for complete compensation with a given internal resistance $r$ of the limiting arrangement can be fulfilled by changing the amount of the inverse voltage, i.e. by adjusting factor K, or with a given value of the inverse voltage, i.e. with a constant number of turns of winding 34 on transformer 30 by means of changing the dynamic internal resistance $r$ of the voltage limiting arrangement. A combination of these two possibilities can also be used.

The operation of the inverter circuit is well-known from Patent 2,997,664, and will be referred to here only very briefly. For the purpose of this discussion, assume that upon connection of the inverter circuit to the D.C. supply source, the leakage current flowing through the collector of transistor 10 is somewhat higher than that flowing through transistor 20. As a result, the current will flow in primary winding 42 of feedback transformer 40 which will induce a voltage in the secondary winding 41 of such polarity to cause the base electrode of transistor 10 to become positive with respect to the emitter. This results in increased conduction of current through transistor 10, increasing the induced feedback voltage, in turn causing transistor 10 to be switched into still more conductive state and simultaneously causing transistor 20 to be switched further into its nonconductive state. This feedback process continues until transistor 10 is completely switched on and transistor 20 is completely shut off. Feedback transformer 40 has a saturable core 43. As soon as saturable core 43 of transformer 40 saturates, the impedance to current flow through the windings of transformer 40 sharply decreases, whereby the current in the feedback circuit and the current through resistor 59 increase further. The result of this is that an increased voltage drop appears across the current limiting resistor 59, whereby the voltage across primary winding 42 of feedback transformer is decreased. The collapsing voltage on winding 42 of transformer 40 induces a voltage of opposite polarity in secondary winding 41. This polarity reversal switches the oscillator transistors into the opposite bistable state where positive feedback maintains this state for the next half cycle. The saturation of the transformer core, therefore, triggers the switching of the transistors and thereby determines the frequency of the created AC voltage.

Since the time for driving the transformer core into saturation and consequently the frequency of the created AC voltage depends on the voltage which is fed to primary winding 42 of transformer 40, the frequency can be stabilized by stabilizing the amplitude of this voltage. Complete stabilization against variations of the supply voltage, however, cannot be accomplished with the circuit of Patent 2,997,644, because the internal resistance of the voltage limiting arrangement, although very small, is not zero. In order to take care of this factor, according to the present invention a compensating voltage, which is proportional to the feedback voltage but has an opposite phase relation, is fed series with the feedback voltage into the primary circuit of feedback transformer 40. This is accomplished by means of winding 34 on output transformer 30, winding 34 being connected in series with primary winding 42 on feedback transformer 40. This compensating voltage is adjusted so that any changes of the feedback voltage created by variations of the DC supply voltage are compensated.

The circuit shown in FIGURE 2 differs from that of FIGURE 1 in that the current limiting resistor 59 is inserted in the lead to the collector electrode of the upper transistor 10 and that a potentiometer 60 is connected between current limiting resistor 59 and terminal 48 of rectifier bridge circuit 50. Potentiometer 60 has an adjustable wiper 61 which is connected to the lower end of primary winding 42 on feedback transformer 40. By adjusting the slider of this potentiometer, the dynamic internal resistance of the voltage limiting arrangement and simultaneously the amount of feedback voltage can be varied such that the above-mentioned condition for complete compensation is fulfilled. All other parts and operation of the circuit of FIGURE 2 are the same as that of FIGURE 1.

Many variations and embodiments are possible within the spirit of this invention. It is, therefore, understood that the specific embodiment of my invention shown here is for the purpose of illustration only, and that my invention is limited only by the scope of the appended claims.

I claim:
1. A push-pull transistor inverter comprising:
   a source of D.C. electric potential having positive and negative terminals;
   a pair of output terminals;
   an output transformer having a secondary winding connected to said output terminals and having a primary winding with an intermediate tap;
   a feedback transformer having a primary and a secondary winding and further having a saturable magnetic core;
   first and second transistors each having a collector electrode connected to the primary winding of said output transformer, each having a base electrode connected to the secondary winding of said feedback transformer, and each having an emitter electrode connected to one terminal of said source of D.C. potential;
   means connecting the other terminal of said source of D.C. potential to said intermediate tap of said primary winding on said output transformer;
   means connecting the primary winding of said feedback transformer to obtain a feedback voltage from said output transformer; and
   compensating voltage generating means including an auxiliary winding on said output transformer connected to said primary winding of said feedback transformer said means providing an A.C. voltage signal of the same frequency as the feedback voltage but of opposite polarity and having such an amplitude as to compensate for any variations in the D.C. supply voltage.

2. Apparatus according to claim 1 wherein a voltage regulating means is connected to said primary winding on said feedback transformer and to said compensating voltage generating means for maintaining the sum of said feedback voltage and said compensating voltage constant.

3. Apparatus according to claim 1 wherein a variable impedance means is connected in series with said primary winding on said feedback transformer for adjusting the amplitude of said feedback voltage.

4. A push-pull transistor inverter comprising:
   a source of D.C. electric potential having positive and negative terminals;
   a pair of output terminals;
   an output transformer having a secondary winding connected to said output terminals and further having a primary winding with an intermediate tap and an auxiliary winding;

a feedback transformer having a primary and a secondary winding and further having a saturable magnetic core;

first and second transistors each having a collector electrode connected to the primary winding of said output transformer, each having a base electrode connected to the secondary winding of said feedback transformer, and each having an emitter electrode connected to one terminal of said source of D.C. potential;

means connecting the other terminal of said source of D.C. potential to said intermediate tap of said primary winding on said output transformer;

means connecting the primary winding of said feedback transformer to obtain a feedback voltage from the collector electrodes of said first and second transistors; and compensating voltage generating means including said auxiliary winding connected to said primary winding of said feedback transformer said means providing an A.C. voltage signal of the same frequency as the feedback voltage but of opposite polarity and having such an amplitude as to compensate for any variations in the D.C. supply voltage.

5. Apparatus according to claim 4 wherein a voltage regulating means is connected to said primary winding on said feedback transformer and to said compensating voltage generating means for maintaining the sum of said feedback voltage and said compensating voltage constant.

References Cited
UNITED STATES PATENTS 3,111,632 11/1963 Murphy _____ 331—113
3,252,107 5/1966 Martin _____ 331—113

ROY LAKE, *Primary Examiner.*

JOHN KOMINSKI, *Assistant Examiner.*